June 19, 1956 J. PUSTE 2,750,703
FISH LURE
Filed Nov. 12, 1954
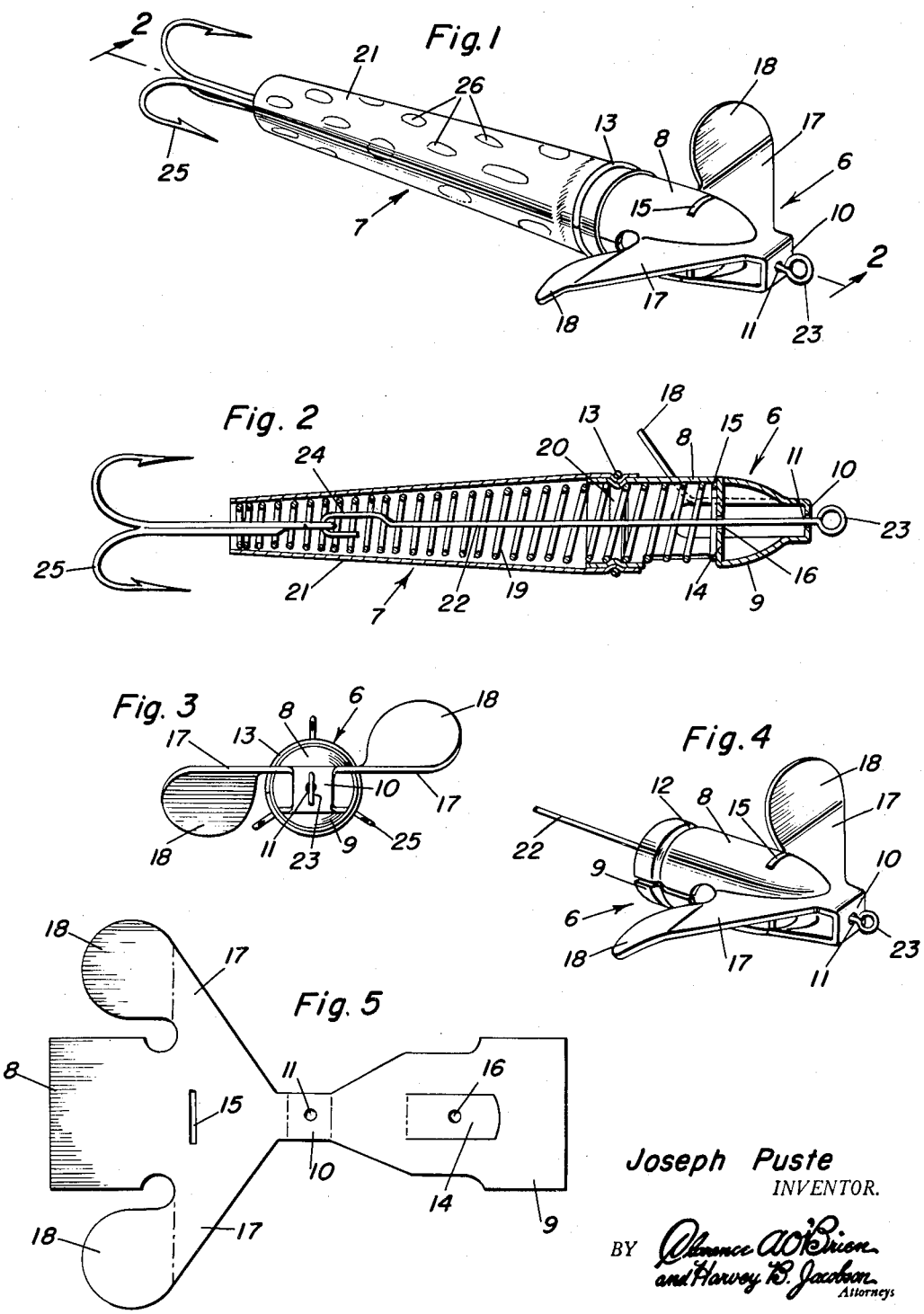
Joseph Puste
INVENTOR.

United States Patent Office 2,750,703
Patented June 19, 1956

2,750,703
FISH LURE
Joseph Puste, Lincoln Park, Mich.

Application November 12, 1954, Serial No. 468,256

2 Claims. (Cl. 43—42.21)

The present invention relates to new and useful improvements in fish lures and has for one of its important objects to provide a device of this character which, to a variety of fish, will have a very lifelike or natural appearance and action.

Another very important object of the invention is to provide a fish lure of the aforementioned character which will constantly rotate as it is drawn through the water.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view of a fish lure constructed in accordance with the present invention;

Figure 2 is a view in longitudinal section through the device, taken substantially on the line 2—2 of Figure 1;

Figure 3 is a front elevational view;

Figure 4 is a perspective view of the head; and

Figure 5 is a plan view of the blank from which the head is formed.

Referring now to the drawing in detail, it will be seen that the embodiment of the invention which has been illustrated comprises a substantially bullet shaped, hollow head of suitable metal which is designated generally by reference character 6. Mounted on the rear end portion of the head 6 is a body 7.

The head 6 comprises a single sheet of metal formed to provide complemental half sections 8 and 9 which are connected at their forward ends by an integral, substantially U-shaped nose 10 which is apertured, as at 11, and with the head open at the rear end. The rear end portion of the head 6 has pressed thereinto a circumferentially extending groove 12 for the reception of a snap ring 13 for securing the rear end portions of the sections 8 and 9 together.

Struck inwardly from the head section 9 is a transversely extending bar 14 having its free end portion engaged in a slot 15 which is provided therefor in section 8. The bar 14 has formed therein an aperture 16 which is longitudinally aligned with the aperture 11. Integral fins 17 extend outwardly and rearwardly from the section 8 of the head 6 and terminate in oppositely bent free end portions 18 for rotating said head as the lure is drawn through the water.

The body 7 includes a rearwardly tapered coil spring 19 of suitable metal which extends into the head 6 and abuts the bar 14, as shown to advantage in Figure 2 of the drawing. The inwardly pressed groove 12 provides an internal rib 20 in the head 6, on which the coil spring 19 is threaded to assist in anchoring the coil spring 19 in said head. The body 7 further includes a flexible sleeve or cover 21 of fabric, rubber or other suitable material which encloses the coil spring 19 and conforms substantially to the shape thereof. The snap ring 13 also anchors the sleeve or cover 21 in the groove 12 in the head 6.

The aligned apertures 11 and 16 constitute bearings for a resilient wire rod or shaft 22. The shaft 22 is provided on its forward end with a loop or eye 23 for connecting a line to the lure. From the head 6, the shaft 22 extends into the body 7 and terminates at its rear end, in a hook 24. A treble fish hook 25 is loosely connected to the hook 24, said treble fish hook emerging from the open rear end of the body 7.

It is thought that the operation of the lure will be readily apparent from a consideration of the foregoing. Briefly, as the lure is retrieved or drawn through the water, the oppositely bent fins 17 cause the head 6 and the body 7 to rotate rapidly and constantly on the shaft 22. The taper of the body 7 gives the lure a streamlined action in the water. The resilient wire shaft 22 and coil spring 19 function as a stiffener for the body 7. As shown in Figure 1 of the drawing, the sleeve or cover 21 of the body 7 may be attractively colored or ornamented, as at 26.

It is believed that the many advantages of a fish lure constructed in accordance with the present invention will be readily understood and although a preferred embodiment of the device is as illustrated and described, it is to be understood that changes in the details of construction may be resorted to which will fall within the scope of the invention as claimed.

What is claimed is:

1. A fish lure of the character described comprising: a substantially bullet shaped, hollow metallic head open at its rear end, said head including complemental half sections, one of said half sections having a slot therein, said head further including a substantially U-shaped, integral nose connecting the forward ends of said half sections, the other of said half sections including an inwardly struck, integral bar engaged in the slot, said bar and said nose having aligned apertures therein, a resilient, tubular body mounted on the head and extending rearwardly therefrom, a coil spring mounted in the head in abutting engagement with the bar and projecting into the body, a resilient, longitudinally extending shaft journaled in the apertures and projecting into the body, a treble fish hook loosely connected to the rear end of said shaft, and fins on the head for rotating said head on said shaft.

2. A fish lure comprising: a substantially bullet shaped, hollow metallic head open at its rear end and including complemental half sections, said head further including a substantially U-shaped, integral nose connecting the forward ends of said half sections, one of said half sections having a slot therein, a bar struck inwardly from the other of said half sections and engaged in the slot, a pressed circumferential rib in the rear end portion of the head defining an external groove, a flexible, tubular, rearwardly extending body on the head, a coil spring mounted in the head and extending rearwardly therefrom into the body for yieldingly supporting same, said coil spring abutting the bar and being threaded on the rib for retention thereby in the head, a snap ring anchoring the body in the groove and securing the rear ends of the half sections together, said nose and said bar having aligned apertures therein, a shaft journaled in the apertures and extending rearwardly from the head into the coil spring and the body, a fish hook connected to the rear end of said shaft, and fins on the head for rotating same on the shaft.

References Cited in the file of this patent
UNITED STATES PATENTS

| | | |
|---|---|---|
| D. 148,254 | Rooke | Dec. 30, 1947 |
| 889,804 | Pflueger | June 2, 1908 |
| 1,451,436 | Barnia | Apr. 10, 1923 |

FOREIGN PATENTS

| | | |
|---|---|---|
| 7,373 | Great Britain | 1893 |
| 12,200 | Great Britain | 1902 |
| 421,046 | Italy | May 16, 1947 |